(12) United States Patent
Yoshitomi

(10) Patent No.: US 11,882,865 B2
(45) Date of Patent: Jan. 30, 2024

(54) METHOD OF FABRICATING PROCESSED FOOD PRODUCT CONTAINING PROTEIN

(71) Applicant: NIPPON SUISAN KAISHA, LTD., Minato-ku (JP)

(72) Inventor: Bunji Yoshitomi, Hachioji (JP)

(73) Assignee: NIPPON SUISAN KAISHA, LTD., Tokyo (JP)

( * ) Notice: Subject to any disclaimer, the term of this patent is extended or adjusted under 35 U.S.C. 154(b) by 265 days.

(21) Appl. No.: 17/287,551

(22) PCT Filed: Oct. 24, 2019

(86) PCT No.: PCT/JP2019/041697
§ 371 (c)(1),
(2) Date: Apr. 22, 2021

(87) PCT Pub. No.: WO2020/085428
PCT Pub. Date: Apr. 30, 2020

(65) Prior Publication Data
US 2021/0352953 A1 Nov. 18, 2021

(30) Foreign Application Priority Data

Oct. 24, 2018 (JP) ................. 2018-199632

(51) Int. Cl.
*A23P 30/20* (2016.01)
*A23L 5/30* (2016.01)
*A23L 33/18* (2016.01)

(52) U.S. Cl.
CPC ............. *A23P 30/20* (2016.08); *A23L 5/34* (2016.08); *A23L 5/36* (2016.08); *A23L 33/18* (2016.08)

(58) Field of Classification Search
CPC .................................. A23P 30/20; A23L 5/36
See application file for complete search history.

(56) References Cited

U.S. PATENT DOCUMENTS

| 2013/0224367 A1 | 8/2013 | Yoshitomi et al. |
| 2016/0183566 A1 | 6/2016 | Yoshitomi et al. |

FOREIGN PATENT DOCUMENTS

| JP | S55-048371 A | 4/1980 |
| JP | S56-051751 Y | 6/1981 |
| JP | S56-127069 A | 10/1981 |
| JP | H05-020590 U | 3/1993 |
| JP | H09-121818 A | 5/1995 |

(Continued)

OTHER PUBLICATIONS

International Search Report and Written Opinion for WO 2020/085428 (PCT/JP2019/041697), dated Jan. 21, 2020, pp. 1-10 (Translation Included).

(Continued)

*Primary Examiner* — Elizabeth Gwartney
(74) *Attorney, Agent, or Firm* — Thomas|Horstemeyer, LLP

(57) ABSTRACT

A method of fabricating a processed food product containing protein includes, while moving a mixture in a tubular body, continuously heat-coagulating the mixture by an interior heating system and shaping the mixture. The mixture contains protein, lipid and water and has flowability. The tubular body includes a heating section and a non-heating section succeeding the heating section. The non-heating section includes a back pressure structure that produces back pressure inside the tubular body.

11 Claims, 6 Drawing Sheets

(56) References Cited

FOREIGN PATENT DOCUMENTS

| | | |
|---|---|---|
| JP | 3179686 B2 | 6/2001 |
| JP | 2002-142724 A | 5/2002 |
| JP | 2003-325138 A | 11/2003 |
| JP | 3614360 B2 | 1/2005 |
| JP | 2013-226083 A | 11/2013 |
| JP | 2013-226084 A | 11/2013 |
| WO | 2012/060348 A1 | 5/2012 |

OTHER PUBLICATIONS

Extended European Search Report for Application No. 19876268.4, dated Jul. 18, 2022, pp. 1-6.
International Search Report and Written Opinion for WO 2020/085428 (PCT/GB2019/053058), dated Jan. 21, 2020, pp. 1-10 (Translation Included).

METHOD OF FABRICATING PROCESSED FOOD PRODUCT CONTAINING PROTEIN

CROSS-REFERENCE TO RELATED APPLICATIONS

This application is the National Stage of International Application No. PCT/JP2019/041697, filed Oct. 24, 2019, which claims priority to JP 2018-199632, filed Oct. 24, 2018, which are entirely incorporated herein by reference.

TECHNICAL FIELD

The present invention relates to a method of fabricating a processed food product containing protein, in which a main raw material that is a protein—such as livestock meat, chicken, a marine product, egg, a plant or the like—is heated and shaped. The fabrication method employs a method of using an interior heating system to continuously heat a heating object. The present invention relates to a fabrication method in which a raw material that irreversibly forms a gel when heated is heated by the interior heating system and extruded from a tubular body, both continuously and stably. As a heating method, Joule heating, microwave heating or high frequency heating, which are interior heating methods, may be employed.

BACKGROUND ART

Regardless of types of object material and purposes, a heating step in food processing causes qualitative changes in an object material and is an important process in setting properties of the object material. Various heating methods are known. Heating methods can be categorized as exterior heating (direct heating or indirect heating) and interior heating (self heating). Joule heating, microwave heating and high frequency heating are typical of systems categorized as interior heating systems.

For example, a technology for fabrication of a pasted livestock meat product is disclosed (Japanese Patent Application Laid-Open (JP-A) No. 2002-142724) in which pasted meat is pre-heated by Joule heating, then shaped, and the shaped paste is heated further by Joule heating. In the fabrication of paste fish loaf products such as chikuwa, satsuma-age, crab-flavor kamaboko and so forth, technologies that employ Joule heating for heating of pasted fish meat after shaping and technologies that employ Joule heating for pre-heating of pasted fish meat before shaping are disclosed (Japanese Utility Model Application Laid-Open (JP-U) No. H5-20590, JP-A No. H9-121818, and Japanese Patent Nos. 3179686 and 3614360).

Microwave heating is widely deployed in a form of microwave ovens. JP-A Nos. S55-48371 and 2003-325138 and Japanese Utility Model Application Publication (JP-Y) No. S56-51751 disclose methods of using microwave heating for heating and shaping skinless paste products. WO2012/060348A discloses a method of heating and shaping a heating object, which is subjected to microwave heating, while feeding the heating object through a tubular body from below to above.

High frequency heating is a heating system that is the same in principle as microwave heating but uses electromagnetic waves with lower frequencies than microwaves.

Sausages, which are known as minced meat processed products, include fish sausages—in which pasted fish meat and auxiliary raw materials are mixed, filled into a casing and heated—and livestock meat sausages—in which pasted meat is filled into an edible casing of sheep intestine or the like, subjected to smoking or the like, heated and eaten. Each of these is a food product that is heat-treated after being shaped in a casing.

SUMMARY OF INVENTION

Technical Problem

In the methods recited in JP-A Nos. S55-48371 and 2003-325138 and JP-Y No. S56-51751, a heating object is extruded while being heated inside a tubular body that is arranged horizontally. In these methods, flash boiling (explosive boiling) occurs in which, when the heating object is gelated by the heating, steam release paths are closed off in the tubular body, internal pressure rises in the tubular body, and the steam and the heating object blow out in an instant. Therefore, the heating object may not be fed out stably.

The present inventors have discovered that, as illustrated in WO2012/060348A, continuous and stable heating is enabled by a method of heating and shaping a heating object that is being subjected to microwave heating while feeding the heating object from below to above through a tubular body that is arranged vertically. This method enables continuous production of a processed food product containing a heat-coagulated protein that is fabricated with a heating step, such as a sausage. That is, this method is based on the principle that, when a tubular body is arranged in the gravity direction, which is to say the vertical direction, and a heating object is continuously moved in the tubular body in the opposite direction to the gravity direction while being heated, steam that is produced in the tubular body by the heating moves smoothly in the same direction as the heated material, which enables stable feeding of the heated material.

However, when a heating section is arranged vertically, the height of a fabrication apparatus is increased. As a result, problems in actual production cannot be avoided, such as management of the apparatus and poor operational efficiency of cleaning and the like. Moreover, although a back pressure acting on a vertical region may restrain flash boiling, a back pressure that is higher than necessary means more energy is required for feeding of the heating object.

An object of the present invention is to provide a method of continuously heating and shaping a heating object with flowability without causing occurrences of flash boiling, which method does not require use of the method of arranging a heating section vertically according to the process for production of protein-containing food disclosed in WO2012/060348A.

Solution to Problem

The gist of the present disclosure is a method of fabricating a processed food product containing protein according to (1) to (13) below.

(1) A method of fabricating a processed food product containing protein, the method including: moving a mixture in a tubular body, the mixture containing protein, lipid and water and having flowability, and the tubular body including a heating section and a non-heating section succeeding the heating section; and while moving the mixture, continuously heat-coagulating the mixture by an interior heating system and shaping the mixture, wherein the non-heating section includes a back pressure structure that produces back pressure inside the tubular body.

(2) The method of fabricating a processed food product containing protein according to (1), wherein the back pressure structure is formed as a high position portion at which at least a portion of the non-heating section is at a higher position in a vertical direction than an end point of the heating section.

(3) The method of fabricating a processed food product containing protein according to claim 2), wherein the high position portion is inflected vertically upward from the end point of the heating section, and a terminal end region of the high position portion is horizontal or inclined by at most 30° relative to the horizontal.

(4) The method of fabricating a processed food product containing protein according to (2), wherein the high position portion is inflected vertically upward from the end point of the heating section and subsequently inflected vertically downward, and a terminal end of the non-heating section is horizontal or inclined by at most 30° relative to the horizontal.

(5) The method of fabricating a processed food product containing protein according to (2), wherein the high position portion includes at least one loop formed coiling upward in the vertical direction from the end point of the heating section.

(6) The method of fabricating a processed food product containing protein according to any one of (1) to (5), wherein the back pressure structure includes a cutting device disposed in the tubular body at the non-heating section, the cutting device cutting the heated and shaped mixture.

(7) The method of fabricating a processed food product containing protein according to (6), wherein the cutting device includes at least one of a cutting wire or a blade.

(8) The method of fabricating a processed food product containing protein according to any one of (1) to (7), wherein the heating section is disposed to be horizontal or inclined by at most 30° relative to the horizontal.

(9) The method of fabricating a processed food product containing protein according to any one of (1) to (8), wherein the interior heating system is microwave heating, Joule heating or high frequency heating.

(10) The method of fabricating a processed food product containing protein according to any one of (1) to (9), wherein the mixture is heated at the heating section to a core temperature of 70° C. to 120° C.

(11) The method of fabricating a processed food product containing protein according to any one of (1) to (10), further including rotating at least one of the heating section or the non-heating section.

(12) The method of fabricating a processed food product containing protein according to any one of (1) to (11), wherein a nozzle is provided that feeds an additional mixture that is different from the mixture into the tubular body, the mixture and the additional mixture are simultaneously fed into the tubular body and are heated and shaped in the tubular body, and the food product is fabricated with a form in which a layer is formed by the mixture and the additional mixture penetrates through a core region in the layer.

(13) The method of fabricating a processed food product containing protein according to any one of (1) to (12), further including supplying a lubricating agent between the tubular body and the mixture.

Advantageous Effects of Invention

In the method of fabricating the present disclosure, even when the heating section of the tubular body is arranged horizontally, because of a height difference between the heating section and the non-heating section and/or the presence of a cutting device, back pressure is produced in the tubular body by gravity and/or resistance of the cutting device. Flash boiling due to the heating of the contents in the tubular body may be prevented by this back pressure, and the heated and shaped heating object may be fed out stably.

Therefore, the heating section of an apparatus may be arranged freely between a vertical direction and a horizontal direction, and the apparatus may be designed with high operational efficiency in accordance with conditions at a production site.

BRIEF DESCRIPTION OF DRAWINGS

FIG. 8b is a variant example of the continuous heating device shown in FIG. 6a.

DETAILED DESCRIPTION

To provide shapeability or to improve shapeability of processed livestock products and processed marine products, primary heating in a relatively low temperature range of 40° C. to 50° C. is applied to a heating object that is a raw material for a processed product, using interior heating such as Joule heating, microwave heating, high frequency heating or the like. In this temperature range, inherent flowability of the heating object is maintained. Thus, the heating object may be subjected to interior heating while being continuously conveyed by, for example, a pump or the like. However, in a heating step for forming a final product of the heating object that has been through the primary heating, the heating object is brought to or above a temperature range that heat-denatures and gelates salt-soluble animal protein contained in the heating object. Consequently, in a food product in which livestock meat or meat derived from marine products is the principal component, particularly myofibrillar proteins contained therein—mainly salt-soluble proteins such as myosin, actomyosin and the like—are irreversibly changed in structure by heating and transformed to a firm gel with a microscopic network structure. As a result, clogging tends to occurs within a tubular body.

Various proposals are made for a continuous heating device 10 for heat-coagulated protein based on livestock meat or meat derived from marine products, which employs an interior heating system.

Figure 1A:
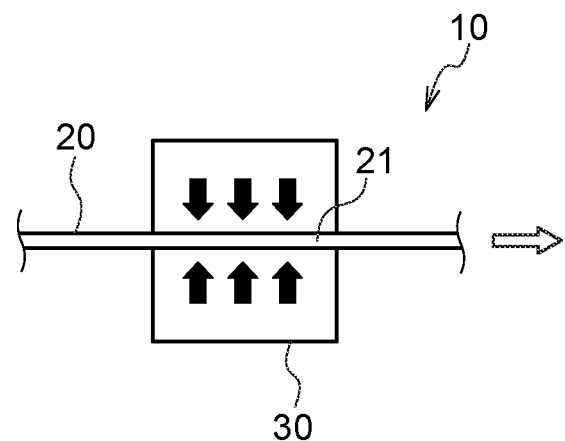
FIG. 1a is a schematic diagram showing a mode of a continuous heating device according to a horizontal direction feeding system.

In a horizontal direction feeding system shown in FIG. 1a, an interior heating device 30 is disposed around a heating section 21 of a tubular body 20, which is arranged in a horizontal direction. Heating is performed by the internal heating device 30 while a heating object is moved in the heating section 21 in the direction indicated by the outline arrow in FIG. 1a. The solid arrows shown in FIG. 1a show directions of heat transfer by the heating. In this system, a relatively low temperature range in which the heating object does not gelate is preferable: in a relatively high temperature range in which protein heat-denatures and gelates such as, for example, 70° C. to 120° C., the heating object loses flowability due to gelation and closes up the flow path. At the same time, because steam that is produced has lower specific gravity than the surrounding substances, the steam moves to an upper portion of the heating section 21. Because there is no path for the steam to escape to the upper side in the tubular body 20 that is in the horizontal direction, internal pressure rises, flash boiling in which the steam and the heating object blow out in an instant occurs, and the heated material may not be fed out stably.

Figure 1B:
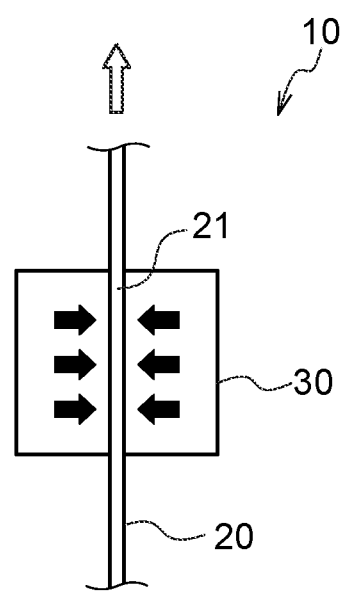
FIG. 1b is a schematic diagram showing a mode of a continuous heating device according to a vertical direction feeding system.

In a vertical direction feeding system shown in FIG. 1b, the internal heating device 30 is disposed around the heating section 21 of the tubular body 20, which is arranged in a vertical direction. Heating is performed by the internal heating device 30 while the heating object is moved continuously in the heating section 21 in the opposite direction to the gravity direction, which opposite direction is indicated by the outline arrow in FIG. 1b. The solid arrows shown in FIG. 1b show directions of heat transfer by the heating. In this system, steam produced in the tubular body 20 by the heating moves smoothly in the same direction as the movement direction of the heating object. Thus, the heated material may be fed out stably (WO2012/060348A).

The present application discloses a method of stably feeding a heated material without requiring a heating section to be arranged vertically, which is an improvement on the method according to WO2012/060348A.

A method of fabricating a processed food product containing protein according to an exemplary embodiment of the present disclosure includes: moving a mixture in the tubular body 20, the mixture containing protein, lipid and water and having flowability, and the tubular body 20 including the heating section 21 and a non-heating section 22 succeeding the heating section 21; and, while moving the mixture, continuously heat-coagulating the mixture by an interior heating system and shaping the mixture. The non-heating section 22 is provided with a back pressure structure 40 that produces back pressure inside the tubular body 20.

More specifically, the back pressure structure 40 may be formed as a high position portion 41 at which at least a portion of the non-heating section 22 is at a higher position in a vertical direction than an end point of the heating section 21. Instead of this back pressure structure 40 or in addition to this back pressure structure 40, a cutting device 42 may be disposed at the non-heating section 22 to serve as the back pressure structure 40, the cutting device 42 cutting the heated and shaped mixture.

The present disclosure does not require use of a vertical direction feeding system, but does not exclude use of the same. In a horizontal direction feeding system, the heating section 21 does not have to be completely horizontal; an inclination is acceptable. Depending on conditions in a factory in which a fabrication apparatus is disposed, a vertical direction heating system, a horizontal direction feeding system and the method according to the exemplary embodiment of the present disclosure may be combined as appropriate.

A heating object serving as a mixed portion having flowability, regardless of type from liquid to solid, must have flowability to a degree that allows use of a pump or the like to feed the heating object into a tubular body at least when the heating object is raw material. In particular, an exemplary embodiment of the present disclosure is appropriate for heating of a raw material with a certain viscosity. If the raw material is a substance with low viscosity like water, convection occurs during movement when the raw material is being continuously heated in the tubular body. Therefore, temperature differences do not occur and cause virtually no problems even in a horizontal direction feeding system. In contrast, if the viscosity is high, heat transfer by convection is unlikely. Therefore, local temperature differences are likely to occur and stable feeding cannot be expected.

More specifically, an exemplary embodiment of the present disclosure is suitable for processing of, among natural products and food materials containing water, protein, starch and the like, particularly food materials containing proteins that are gelated by heat, including pasted meat, eggs and the like. Even among materials in which protein does not gelate, materials with high viscosity—such as materials with properties similar to miso paste, materials with properties similar to cream, materials with properties similar to porridge and the like—and materials containing protein and sugar—such as medicinal raw materials containing components derived from natural products, medicinal components, health food raw materials, growth mediums and the like—may be heated by the method according to the exemplary embodiment of the present disclosure for continuous heating by interior heating.

The tubular body 20 includes a cavity inside which a heating object can flow. A preferable material of the tubular body 20 transmits interior heating, which is to say microwaves or high frequency waves, features electrical insulation, and features heat endurance. A synthetic resin, silicon resin or fluoride resin that is resistant to adherence of the heating object, or a tube that is surface-treated with one of these materials, is preferable. A diameter of the tubular body 20 depends on the heating method and heat energy levels. When the heating method is microwave heating, the half-power depth in raw materials is not particularly deep. Therefore, a tubular body with a diameter of not more than 40 mm and preferably not more than 30 mm is desirable.

When the heating method is high frequency heating, the half-power depth of the electromagnetic waves is deeper than for microwaves. Therefore, the tubular body 20 that is used may have a larger diameter. With Joule heating, because the principle of heating is different from microwaves, the diameter theoretically depends on the sizes of heating electrodes. Therefore, the tubular body 20 that is used may have a diameter of 200 mm. The length of the tubular body 20 is adjusted to a length with consideration for the speed of movement of the heating object and a required target temperature.

The internal heating device 30 employing an interior heating system is disposed at the outside of the heating section 21 of the tubular body 20. For example, in the example shown in FIG. 2a and FIG. 2b, microwave heating devices 31 are used. That is, in the side view of FIG. 2a, magnetrons that serve as the microwave heating devices 31 are mounted at three locations of the outer periphery of the heating section 21 along the feeding direction indicated by the arrow. These microwave heating devices 31 are equally spaced at 120° as shown in the plan view in FIG. 2b. When the heating object is fed into the tubular body 20, the heating object absorbs microwaves radiated by the microwave heating devices 31 of the heating section 21. Thus, the heating object is microwave-heated. Alternatively, in the example shown in FIG. 3, a Joule heating device 32 is used. That is, a pair of electrodes 32A that serve as the Joule heating device 32 are mounted at both ends of the heating section 21. Respective electric wires 32B are connected to the electrodes 32A and supply high-frequency electromagnetic current. When the heating object is fed into the tubular body 20, high-frequency currents are conducted between the pair of electrodes 32A while the heating object is passing through the heating section 21 at which the internal heating device 30 is disposed. Thus, the heating object is Joule-heated.

The heating section 21 of the tubular body 20 is a region in which the heating object passing through the tubular body 20 is heated by the interior heating method described above. The non-heating section 22 is a succeeding region subsequent to the heating section 21. The non-heating section 22 may simply be an extension of the same material as the heating section 21. Alternatively, the non-heating section 22 may be a tubular body of a different material that is joined to the heating section 21. In a region in which the tubular body 20 is inflected, various kinds of joint may be used, in which case it is preferable that the interior of the tubular body 20 is connected smoothly and that a constant diameter is maintained.

The back pressure structure 40 is a structure that is provided at the non-heating section 22 of the tubular body 20 and produces back pressure inside the tubular body 20. For example, the back pressure structure 40 may be formed as the high position portion 41, at which at least a portion of the non-heating section 22 is at a higher position in the vertical direction than the end point of the heating section 21. That is, as in the continuous heating device 10 shown in FIGS. 4a to 4c, the high position portion 41 in which at least one region of the non-heating section 22 is disposed at a higher position in the vertical direction than the end point of the heating section 21 may serve as the back pressure structure 40.

Figure 4A:
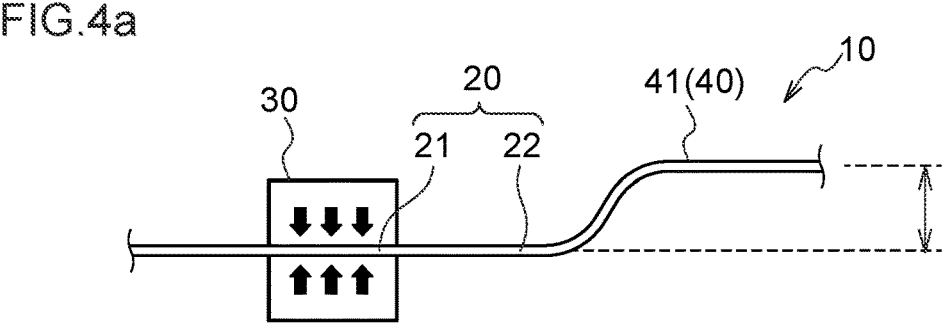
FIG. 4a is a schematic diagram showing an example of a back pressure structure of a continuous heating device according to a mode of the present disclosure.

For example, in the example shown in FIG. 4a, the high position portion 41 is inflected vertically upward from the end point of the heating section 21, and a terminal end region of the high position portion 41 is horizontal or inclined at an angle of not more than 30° relative to the horizontal. In the example shown in FIG. 4b, the high position portion 41 is inflected vertically upward from the end point of the heating section 21 and a little further on inflected vertically downward, and the terminal end of the non-heating section 22 is horizontal or inclined at an angle of not more than 30° relative to the horizontal. In the example shown in FIG. 4c, at least one loop coiling upward in the vertical direction from the end point of the heating section 21 is formed to serve as the high position portion 41.

In each of these, the inclined state approaching the high position portion 41 is not particularly limited and the length of the high position portion 41 may be specified arbitrarily, provided there is a height difference between the end point of the heating section 21 and the higher position of the high position portion 41, as indicated by the two-headed arrows in the drawings. It is sufficient that the height difference between the end point of the heating section 21 and the higher position of the high position portion 41 is specified such that a back pressure, which is gravity acting on the heating object disposed in the non-heating section 22, is greater than a flash boiling pressure inside the heated tubular body 20. Thus, if a distance of the high position portion 41 from the end point of the heating section 21 to the higher position is long, the height difference may be small, and if the height difference is large, the distance to the higher position may be short. The required height difference varies depending on factors such as the composition of the heating object, processing quantities, processing temperatures, the pipe diameter of the tubular body 20 and so forth. In practical terms, a pressure-resistant flexible hose may be used as the non-heating section 22 and the height difference adjusted such that flash boiling does not occur.

For example, when a tube with a diameter of 1 to 4 cm is used, a length of the heating section 21 of 0.5 to 2 m, a length of the non-heating section 22 of 0.5 to 8 m, 1 to 6 m or 3 to 5 m, and a height difference of 30 to 100 cm or 40 to 80 cm are suitable.

Figure 4B:
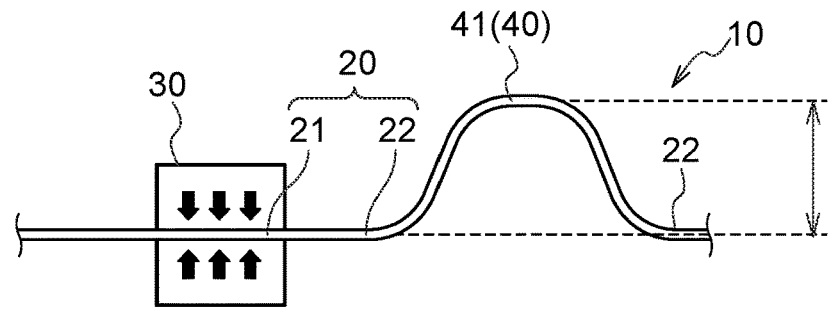
FIG. 4b is a schematic diagram showing an example of a back pressure structure of a continuous heating device according to a mode of the present disclosure.
Figure 4C:
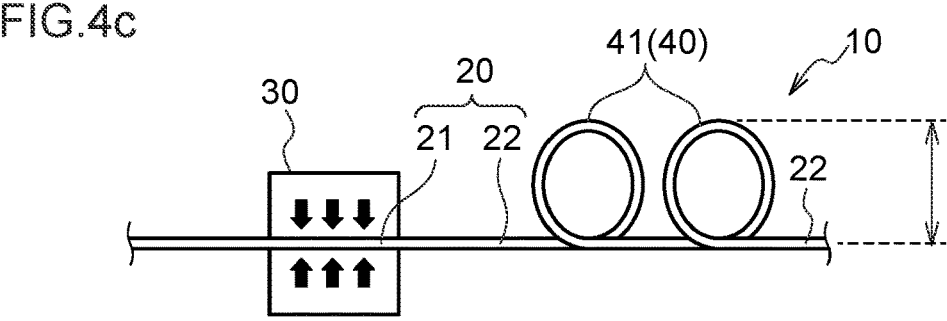
FIG. 4c is a schematic diagram showing an example of a back pressure structure of a continuous heating device according to a mode of the present disclosure.

Apart from the shapes of the continuous heating device 10 shown in FIG. 4a to FIG. 4c, the shape of the non-heating section 22 may be formed in various structures provided a required height difference is provided and a required back pressure is produced.

A weight due to gravity is continuously applied to the heating object in the tubular body 20 by the back pressure structure 40 as described above. Thus, internal pressure in the tubular body 20 is raised. As a result, the boiling point of water contained in the raw material rises, and the raw material may be stably heated to a higher temperature than at usual pressure. Moreover, steam produced in the tubular body 20 and thermal expansion of the heating object due to the heating are suppressed, which contributes to stable feeding of the heating object.

Figure 5:
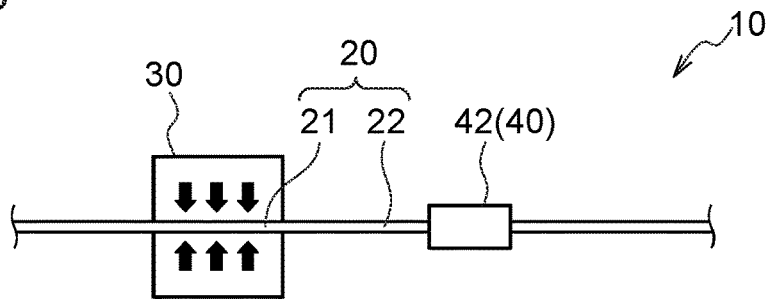
FIG. 5 is a schematic diagram showing an example of a back pressure structure of a continuous heating device according to a mode of the present disclosure.

The cutting device 42 that cuts the heated and shaped mixture may be disposed at the non-heating section 22 to serve as the back pressure structure 40, as in the continuous heating device 10 shown in FIG. 5. The cutting device 42 is, for example, cutting wires such as strong, narrow, wire-shaped bodies similar to piano wire, blades, or a combination thereof. The heated and shaped mixture is cut parallel with the feeding direction by the cutting device 42.

At the same time as the cutting device 42 is cutting into the heated and shaped mixture, resistance, which is to say back pressure, is applied to the heating object moving through the tubular body 20. Because the processed food product containing protein, which is the mixture that has just been heated and shaped, is soft and can be cut easily, the mixture can be pressed against a cutting wire or longitudinally sliced by a blade. By combining plural numbers of the cutting wires or blades, the cutting device 42 may be formed as a grid-form mesh with a 2 to 10 mm or 2 to 5 mm spacing rather than simply dividing into two, three, four or eight equal sections or the like. Thus, the mixture may be longitudinally sliced into fiber shapes.

When the number of cutting wires or blades is larger, the resistance that is the back pressure is larger by a corresponding amount. The magnitude of the resistance may be adjusted by methods such as disposing the cutting wires or blades separately at plural locations, disposing the cutting wires or blades at angles relative to the cross section of the processed food product containing protein, and the like. A fluoride resin material or a fluoride resin-treated material may be employed to form the cutting device 42, in order to reduce the resistance. Alternatively, the resistance may be increased when stainless steel or the like is used as a material of the cutting device 42.

When the cutting device 42 is used to longitudinally slice fiber shapes, a particular conventional device for products such as crab sticks, scallop-flavor fibrous kamaboko and the like is not necessary. Thus, these products may be fabricated more easily.

Figure 6A:
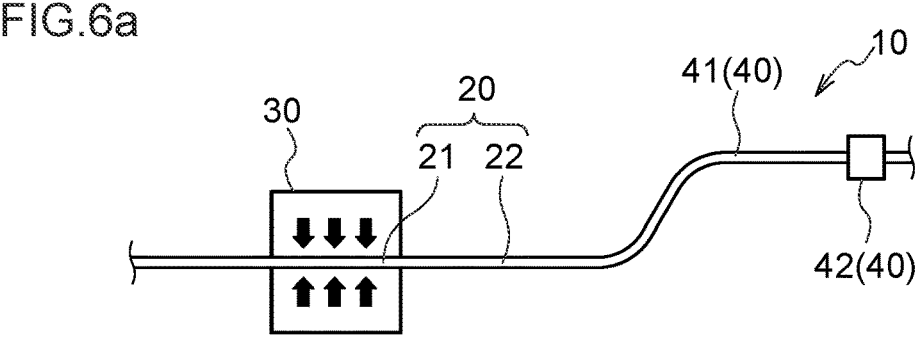
FIG. 6a is a schematic diagram showing an example of a back pressure structure of a continuous heating device according to a mode of the present disclosure.
Figure 6B:
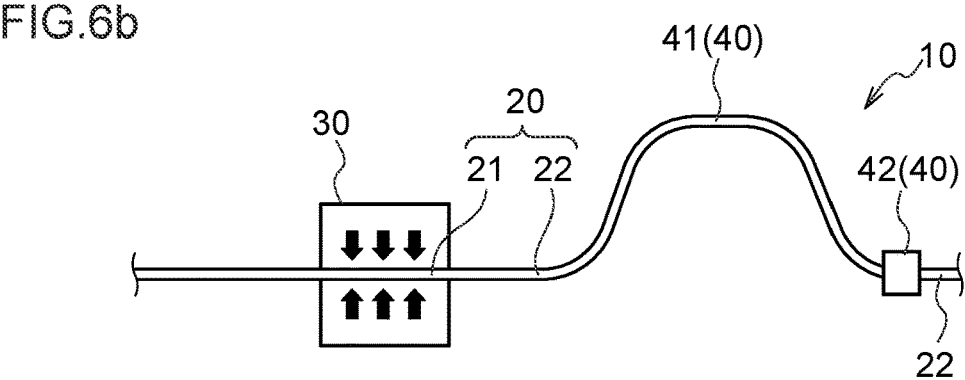
FIG. 6b is a schematic diagram showing an example of a back pressure structure of a continuous heating device according to a mode of the present disclosure.

The method of providing the high position portion 41 at the non-heating section 22 of the tubular body 20 or the method of disposing the cutting device 42 at the non-heating section 22 may be employed individually as the back pressure structure 40, as in the continuous heating device 10 shown in any of FIG. 4a to FIG. 4c and FIG. 5, or these methods may be employed in combination as the back pressure structure 40, as in the continuous heating device 10 shown in FIG. 6a or FIG. 6b. In the example shown in FIG. 6a, the cutting device 42 is disposed at the terminal end of the high position portion 41 according to FIG. 4a. In the example shown in FIG. 6b, the cutting device 42 is disposed at the terminal end of the non-heating section 22 subsequent to the high position portion 41 according to FIG. 4b. When the high position portion 41 or the cutting device 42 is used alone, design such that the corresponding back pressure is greater than a boiling flash pressure is sufficient, and when the high position portion 41 and cutting device 42 are used in combination, design such that the sum of the respective resistances is greater than the flash boiling pressure is sufficient.

When the cutting device 42 is used alone as the back pressure structure 40, depending on the properties of the heating object, sufficient resistance may be provided by setting an opening area of the cutting device 42 to 70% or less of the cross-sectional area of the internal cavity of the tubular body 20.

Figure 3:
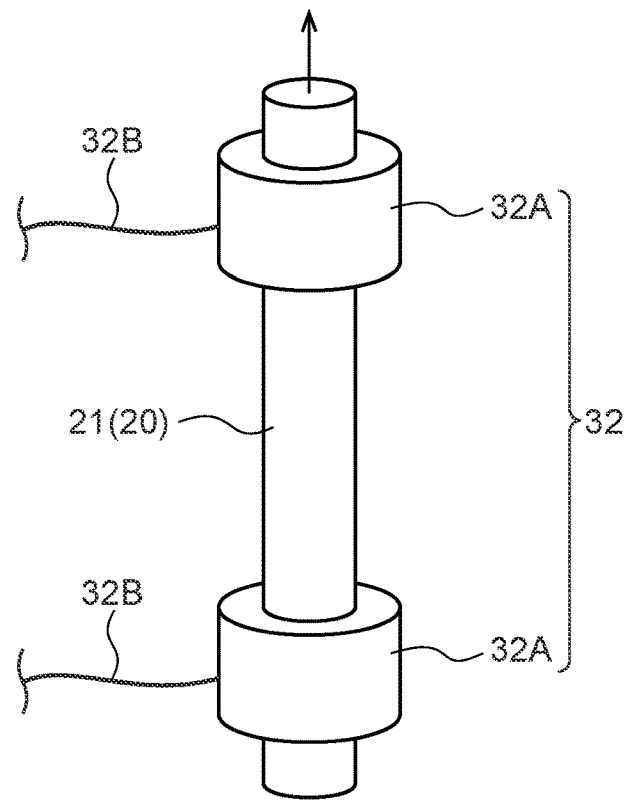
FIG. 3 is a schematic diagram showing a mode of a Joule heating device that is employed when Joule heating is used as the interior heating system.

Joule heating is one interior heating system that is referred to as electric heating, being a method that directly electrifies a heating object such as a food product or the like and generates heat in accordance with electrical resistance of the heating object. A Joule heating device that may be employed to continuously heat a food product with flowability is a device such as those disclosed in JP-A No. 2002-142724, JP-U No. H5-20590, JP-A No. H9-121818, Japanese Patent No. 3,179,686 and the like. More specifically, as shown in FIG. 3, the Joule heating device 32 includes the insulating tubular body 20 and the pair of electrodes 32A provided at the tubular body 20, and the electrodes 32A are connected to an electricity source via the electric wires 32B. This device may be employed in the fabrication method according to the present exemplary embodiment, if a pump is connected so as to continuously feed the heating object into the tubular body 20 and a receptacle or cooling section is provided for receiving the heated food product. Techniques for preventing a food product with flowability from sticking inside a tubular body when the food product is heated in the tubular body by Joule heating, and technologies such as providing temperature sensors for temperature management, are known. These technologies may be employed in modes of the present disclosure.

As an example, the Joule heating device 32 that is used may have a voltage of around 150 to 400 V and a current of around 10 to 30 A.

Microwave heating is a method of heating by vigorously oscillating electric dipoles such as water molecules and the like that are contained in a heating object with high-frequency waves. The principle of microwave heating is applied in domestic microwave ovens and is widely deployed. A microwave heating device that may be employed is a device such as those disclosed in JP-A Nos. S55-48371 and 2003-325138, JP-Y No. S56-51751 and WO2012/060348A. Basically, as shown in, for example, FIG. 2a and FIG. 2b, the device is formed of the tubular body 20, which is formed of a fluoride resin that is transmissive of high-frequency waves, and the microwave heating devices 31, which irradiate high-frequency waves onto a region of the tubular body 20. This device may be used in the fabrication method according to the present exemplary embodiment, if a pump is connected so as to continuously feed the heating object into the tubular body 20 and a receptacle or cooling section is provided for receiving the heated food product.

As an example, the microwave heating devices 31 that are used may be at around 2450 Hz, 200 V, 20 A.

High frequency heating is a heating system that uses electromagnetic waves with lower frequencies than in microwave heating. Devices and principles that may be employed are basically similar to microwave heating.

Figure 7:
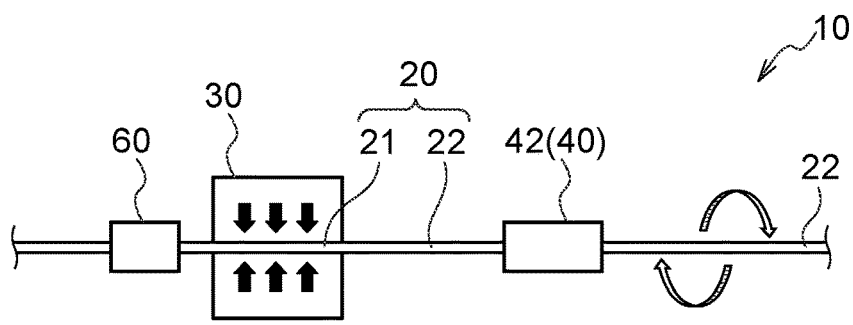
FIG. 7 is a variant example of the continuous heating device shown in FIG. 5.
Figure 8A:
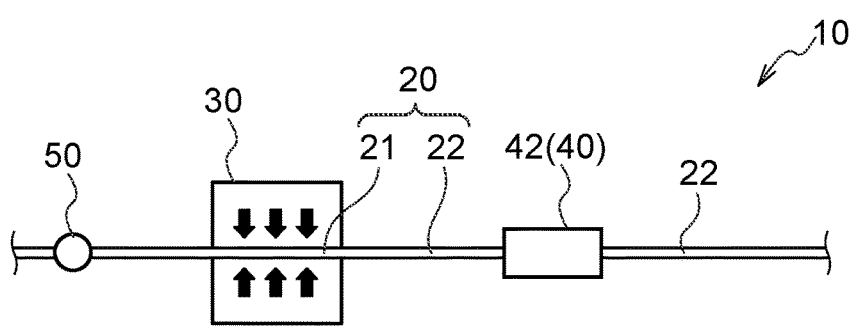
FIG. 8a is a variant example of the continuous heating device shown in FIG. 5.
Figure 8B:
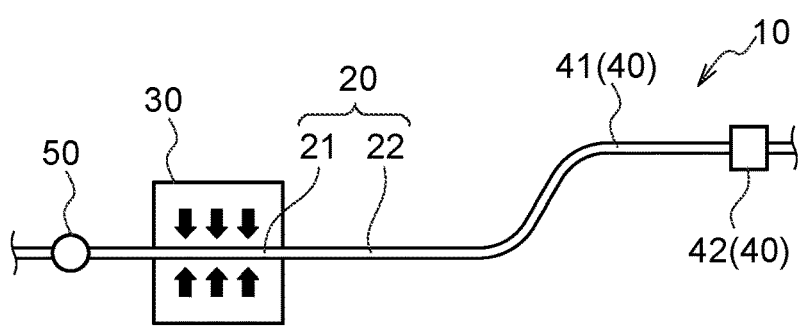
Figure 8C:
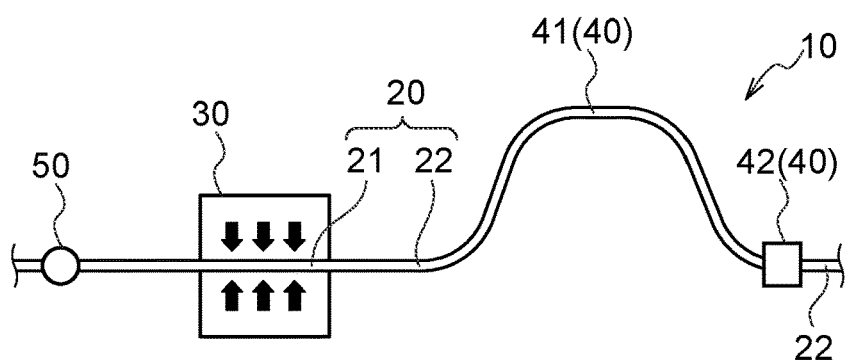
FIG. 8c is a variant example of the continuous heating device shown in FIG. 6b.
Figure 8D:
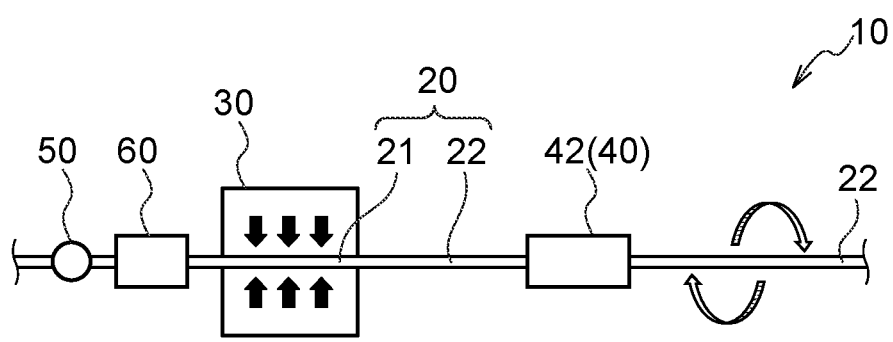
FIG. 8d is a variant example of the continuous heating device shown in FIG. 7.

When the heating object is being heated, heating while rotating the tubular body 20 about a rotation axis in the length direction of the tubular body 20 is desirable, as in the continuous heating device 10 shown in FIG. 7, which is a variant example of the example in FIG. 5 in which the cutting device 42 is provided to serve as the back pressure structure 40. That is, while the heating object is being fed into the tubular body 20, it is desirable to heat the heating object while the tubular body 20 is being rotated about the rotation axis in the length direction thereof by a rotation device 60.

Figure 2A:
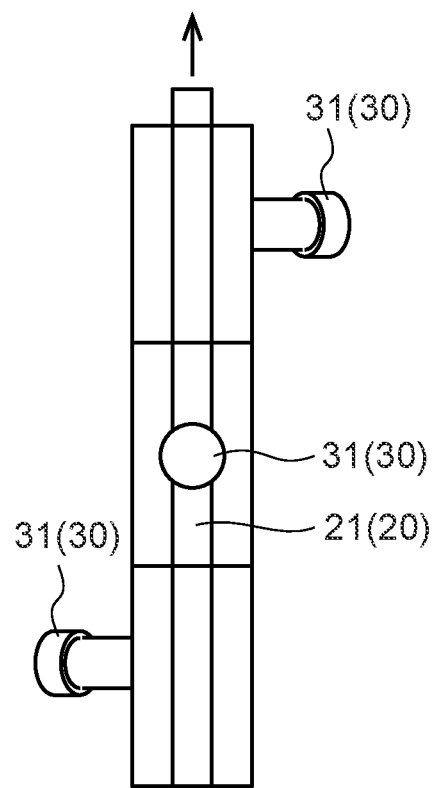
FIG. 2a is a schematic diagram showing a side view of a mode of a microwave heating device that is employed when microwave heating is used as an interior heating system.
Figure 2B:
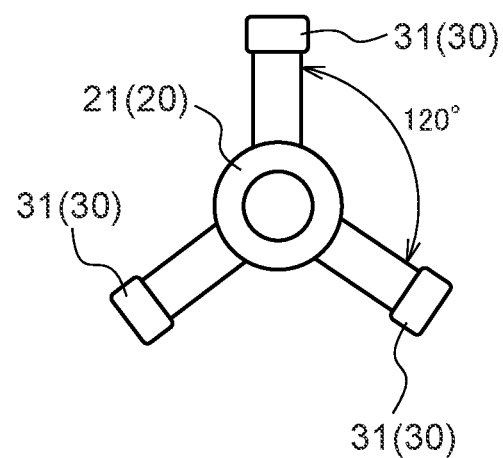
FIG. 2b is a schematic diagram showing a plan view of a mode of the microwave heating device that is employed when microwave heating is used as the interior heating system.

For example, in the case of microwave heating, the microwave heating devices 31 are devices that are disposed at angles of 120° around the tubular body 20, as shown in FIG. 2a and FIG. 2b, to heat uniformly. Even with this structure, a degree of unevenness in heating occurs depending on positions of the microwave heating devices 31 and differences in microwave absorption ratios of heating objects. In particular, differences are larger in a heating object with high viscosity, which may lead to problems with product quality. However, it has been discovered that unevenness in heating may be reduced and product quality may be greatly improved by rotating the tubular body 20 through which the heating object is passing. When the tubular body 20 is rotated, a processed food product containing protein that is heat-coagulated may rotate without collapsing or breaking up inside the tubular body, the heating object may rotate together with the tubular body 20, and an effect of uniform heating may be provided. A rotation speed may be suitably adjusted in accordance with the type of heating object and the length of the heating section 21 of the tubular body 20; a satisfactory effect may be provided with a rotation speed of 5 to 30 rpm, and around 10 to 20 rpm is preferable.

To rotate the tubular body 20, for example, a method as illustrated in WO2012/060348A may be employed. For example, if a rotary joint or the like is disposed between the tubular body 20 and a modified tubular region, which is between the pump that feeds the heating object and the tubular body 20, the tubular body 20 may be freely rotated. The rotation device 60 is desirably a driving device capable of adjusting the rotation speed. Attaching this rotation device 60 to the tubular body 20 and arbitrarily adjusting the rotation speed of the tubular body 20 is desirable. Of the tubular body 20, one or both of the heating section 21 and the non-heating section 22 may be rotated.

The meaning of the term "processed food product containing protein" as recited in the present disclosure is intended to include a food product in which protein contained in a raw material may be heat-coagulated, such as a livestock meat sausage, a fish sausage or a fish paste product.

Processed products obtained by adding arbitrary food materials to a principal component that is livestock meat or meat derived from marine products, kneading the same to form kneaded meat, and heating the kneaded meat are common among processed livestock products and processed marine products. Examples include hams, sausages, meat patties, meat loafs, and fish paste products. When these processed products are industrially manufactured, a raw material heating step and a shaping step are carried out as two separate steps. The shaping step includes forming an arbitrary shape, filling a casing or the like.

According to modes of the present disclosure, livestock meat, meat derived from marine products, or a meat substitute derived from pulses ("fake meat") is used as a principal component, arbitrary food materials are added thereto, the same is kneaded to form a kneaded meat, lipid is added to the kneaded meat, and this mixture serves as the heating object. Hence, after the heating object is gelated by heating, the lipid is retained in the heated gel but a portion of the lipid is released. Dynamic friction between an inner wall of the tubular body 20 and the heated gel is reduced by a lubrication effect of the released lipid, as a result of which smooth conveyability of the heated gel may be maintained.

Fish sausage is usually fabricated by mixing fish meat surimi (pasted fish) with supplementary raw materials such as table salt, seasonings such as sugar and the like, condiments, starch, vegetable oil and so forth, pasting the same, filling a casing fabricated of synthetic resin, and then retort-heating. In contrast, in a mode of the present disclosure, fish sausage is fabricated by heat-coagulating the paste while moving the paste in the tubular body 20, without filling the paste into a casing. Therefore, the fish sausage may be fabricated continuously without using a casing.

Any processed food product containing protein, not limited to fish sausage, that is fabricated by heat-coagulating a raw material with the properties of a liquid or paste containing protein may be fabricated by this method.

In the present disclosure, when a method that employs the cutting device 42 as the back pressure structure 40 is employed, as well as being able to provide shredded fish sausage or the like, fibrous kamaboko products and products such as "crab sticks" may be produced continuously. When a grid-form mesh of 2 to 3 mm is used at the non-heating section 22 as the cutting device 42, kamaboko that is heated and shaped in a cylindrical shape can be shredded to fiber shapes. Kamaboko that is extruded in this cylindrical shape may be wrapped in a resin film or edible film and cut to fabricate crab sticks, scallop-flavor kamaboko or the like. When a kamaboko mixture with a low oil content is used, a lubricating agent or the like, which is described below, may be additionally used.

In "Fish ham and fish sausage quality indication standards" stipulated by Japan's Ministry of Agriculture Forestry and Fisheries (Public Notice of the Ministry of Agriculture, Forestry and Fisheries No. 1658 of 2000, enacted December 19, and finally revised in Public Notice of the Ministry of Agriculture, Forestry and Fisheries No. 1368 of 2008), the definition of "ordinary fish sausages" includes this definition of fish ham: "(1) Salt-preserved cuts of fish meat (including meat of whales and other marine products beside fish, and the same hereafter) ("cuts of fish" hereafter); or the same mixed with salt-preserved cuts of meat (pork, beef, horse meat, mutton and lamb, goat meat, rabbit meat, or poultry meat, and the same hereafter), vegetable protein with a meat-like structure ("meat-like vegetable protein" hereafter), or fat layers (meat-like vegetable protein and fat layers each being limited to pieces of not less than around 5 g), to which a filler is added or not added and the same is seasoned with seasoning(s) and condiment(s); or the same mixed with added edible oil, a binding or reinforcing agent, antioxidant, preservative, etc., the same being filled into a casing and heated (limited to a proportion by weight of fish meat in the raw materials exceeding 50%, a proportion by weight of cuts of fish in the raw materials being at least 20%, a proportion by weight of filler in the raw materials being less than 50%, and a proportion by weight of vegetable protein in the raw materials being at most 20%); or (2) (1) cut into blocks or thinly sliced and wrapped."

Fish sausage is defined as "(1) Fish meat minced or fish meat made into surimi, or the same with meat or minced meat added, that is seasoned with seasoning(s) and condiment(s), to which starch, powdered vegetable protein, another binding ingredient, edible oil, a binding or reinforcing agent, antioxidant, preservative, etc. are added or not added, and that is pasted, the paste (simply "pasted fish" hereafter) having a lipid content of not more than 2%, filled into a casing and heated (limited to a proportion by weight of fish meat in the raw materials exceeding 50% and a proportion by weight of vegetable protein in the raw materials being at most 20%, and the same applying to special fish sausage); or (2) (1) cut into blocks or thinly sliced and wrapped."

The meaning of the term "fish ham and sausages" as used in the present disclosure is intended to encompass fish hams and sausages defined as above, and also to encompass products in which raw materials including at least 30% by weight of fish meat and including at least 2% by weight of lipid are pasted and processed by heating. Modes of the present disclosure are intended to encompass casingless products that are heated without being filled into a casing.

The meaning of the term "processed food product containing protein" as used in modes of the present disclosure is intended to encompass products of which the main raw material is, apart from livestock meat or a marine product, egg protein, milk protein or vegetable protein. Each of these is the same in that the protein is heat-coagulated by heating. Thus, a processed food product may be produced by the same method.

Salt-soluble proteins structuring myofibrils contained in livestock meat or meat derived from marine products have the property of dissolving when salt is added. Because these salt-soluble proteins are fibrous proteins and have hydrophobic groups and hydrophilic groups within their structure, they have an emulsification action. Therefore, when salt is added to pasted meat and thoroughly pulverized and then lipid is added and kneaded in, a uniform emulsion is obtained.

Gelation caused by heating is a phenomenon in which the three-dimensional structure of a salt-soluble protein dissolved by a salt is changed by heating and forms complex three-dimensional tangles, forming a microscopic network structure. When the three-dimensional structure of the salt-soluble protein is changed by heating, the emulsifiability thereof falls at the same time, and the salt-soluble protein momentarily releases the emulsified lipid. Lipid is captured in the microscopic network structure formed at this time and is retained in the structure. Meanwhile, lipid released outside the microscopic network structure functions as lubricating oil. Therefore, dynamic friction resistance between the gelated salt-soluble protein and the inner wall of the heating device is lowered, conveyability is improved, and adherence to the apparatus decreases.

Due to these multiple factors, fish sausage or the like may be produced literally continuously.

In the processed food product containing protein according to modes of the present disclosure that is fabricated from raw materials including protein, lipid and water, the added lipid is preferably 2% to 35% by weight of the raw materials. The lipid is uniformly dispersed in the kneaded meat of which livestock meat or fish meat is the principal component. If the lipid addition amount is too small, conveyability for the heated gel is not provided. If the lipid addition amount is too large, gel formation is impeded. A preferable range is 5% to 20% by weight.

Lubrication may be improved by using a solid oil/fat as the lipid included in the raw materials of the processed food product containing protein. That is, according to modes of the present disclosure, a solid oil/fat is used as the lipid added to the raw materials. A liquid oil/fat also has a certain effect but when a liquid oil/fat is used, because the raw materials include protein, the oil/fat is emulsified and its effectiveness as lubricating oil is weaker. If a solid oil/fat is dispersed and kneaded in the solid oil/fat state, then when the mixture is heated and shaped, the solid oil/fat melts at peripheral edge portions of the inner wall of the tubular body and functions as lubricating oil.

A solid oil/fat that is selected has a melting point higher than temperatures of the raw material mixture before the heating. In practical terms, if an edible oil/fat has a melting point at least 7° C. higher than a raw material mixing temperature before the heating, the oil/fat will not melt during mixing. For example, when the raw material is fish meat, mixing is usually conducted at a temperature of not more than 15° C. with a view to preventing protein denaturing. If the mixing temperature is 15° C., an oil/fat with a melting point of at least 22° C. may be used, and if the mixing temperature is 8° C., an oil/fat with a melting point of at least 15° C. may be used. If the melting point is very high, the mouth feel of the food product that is produced will be adversely affected. Therefore, it is preferable to use a solid oil/fat with a melting point of around 15° C. to 70° C., and an oil/fat with a melting point of 15° C. to 45° C. is particularly preferable. An addition amount of the solid oil/fat is preferably a content by weight in the raw material mixture of 2% to 20% by weight, and particularly preferably 5% to 10% by weight. Solid oils/fats with a variety of melting points may be mixed and used, and liquid oil/fat may also be mixed in and used. It is preferable if the total content of solid oil/fat and other lipids is 2% to 35% by weight of the whole of the processed food product containing protein.

As necessary, a deaeration treatment is applied to the kneaded meat that is obtained. The kneaded meat serving as the heating object is continuously conveyed, by a conveyance device such as a meat-feeding pump or the like, in the tubular body 20 that is a horizontal direction feeding system oriented with a long axis direction in a horizontal direction, with gravity acting in the vertical direction. While the kneaded meat is being conveyed, heating is conducted to raise a core temperature of the kneaded meat to an arbitrary specified temperature in a range of at least 70° C. and at most 120° C., by Joule heating, microwave heating, high frequency heating, or a combination of these heating methods. A gel formed in the tubular body 20 is continuously extruded, providing the heated and shaped processed product. With a heating temperature of less than 70° C., heat denaturing of the protein is insufficient and a gel with excellent properties is not obtained. With a heating temperature of more than 120° C., the gel is formed but the gel structure is damaged by the effects of the high temperature and the gel strength is weakened.

When the heating object is fed into the tubular body after deaeration, the formation of large air bubbles in the processed food product containing protein may be prevented. With a sausage that is filled into a casing, the formation of air bubbles is suppressed by the casing even without deaeration. However, without a casing, air bubbles that are visually obvious may result if deaeration is not performed.

Regardless of the lipid contained in the raw materials, more stable feeding of the heating object may be enabled by including a lubricating agent that facilitates sliding between the tubular body 20 and the heating object. In modes of the present disclosure, the meaning of the term "lubricating agent" is intended to include an agent that can be used in food or drink, reduces friction against the inner wall of the tubular body 20 while a heating object with flowability is being conveyed in the tubular body 20, and makes conveyance smoother. A lubricating agent that is a liquid at the time of use is preferable. More specifically, lubricating agents that may be selected include: water; oils containing vegetable oil/fat, animal oil/fat or the like; alcohol; emulsifying agents; and the like, and a lubricating agent that may be selected is suitable for the food or drink being conveyed.

One method of supplying a lubricating agent is a method of supplying an oil/fat, water or the like to between the heating object and the tubular body 20 while the heating object is being fed into the heating section 21 at which the internal heating device 30 is provided. Excellent flowability of the heating object in the tubular body 20 may be obtained by supplying the lubricating agent. More specifically, a device disclosed in WO2012/060348A may be employed and the lubricating agent may be supplied by using the device, in which a supply section that supplies the lubricating agent is formed, prior to the heating section 21 of the tubular body 20.

The fabrication method according to the modes described above may be embodied by the following procedure.

A principal raw material that is livestock meat or meat derived from marine products, which contains salt-soluble protein derived from myofibrils, is supplied to a kneading machine such as a silent cutter or the like and is thoroughly shredded. A temperature at this time is kept as low as possible; in the region of 10° C. is desirable. Salt is added, and the salt-soluble protein derived from myofibrils contained in the raw material is thoroughly dissolved. Thereafter, as required, starch, vegetable protein, condiments, seasonings, an emulsifying agent and the like are added, and lipid is added at around 2% to 35% by weight of the kneaded meat. A lipid that may be used is a lipid that is suitable for eating such as a vegetable oil, hydrogenated oil, pork fat, beef fat or the like. Lipid contained in the livestock meat or meat derived from marine products that is the raw material may be employed. After the addition of the lipid, the mixture is thoroughly kneaded again, and the added lipid is uniformly dispersed and emulsified. As required, a deaeration treatment is applied during the kneading.

The kneaded meat, serving as the heating object, is continuously fed into the tubular body 20 by a meat-feeding pump or the like. The kneaded meat is heated to a predetermined temperature in a temperature range of at least 70° C. and at most 120° C. by Joule heating, microwave heating, high frequency heating, or a combination thereof. The heating may be freely adjusted in order to obtain optimum properties by, for example, two-stage heating of initial heating to 30° C. and then heating to the predetermined temperature, or heating in plural stages as required; rates of temperature rise during the heating may be adjusted.

The kneaded meat that is gelated by the heating is continuously heated, shaped and extruded from the heating device without losing conveyability, due to the lipid contained therein. Thus, the desired processed product is provided continuously.

If the kneaded meat is similarly heated and shaped while the tubular body 20 is being rotated, uneven heating of the surface of the kneaded meat is prevented by the rotation of the tubular body 20. Thus, an even more preferable product can be provided.

As the livestock meat or meat derived from marine products according to modes of the present disclosure, seafood surimi, minced fish meat, minced livestock meat or the like may be employed. Products with a range of diameters may be continuously produced simply, by appropriate selection of the diameter of the tubular body of the heating device.

The processed food product containing protein according to modes of the present disclosure is produced continuously like a rope, cut to appropriate lengths in accordance with purposes, and used.

Modes of the present disclosure include an exemplary embodiment in which two or more types of material are combined when heating and shaping is conducted, as described below.

According to modes of the present disclosure, a food product with a form in which a layer is formed of the mixture and a different additional mixture penetrates through a core region in the layer may be fabricated as a processed food product containing protein. This food product may be fabricated by, as in the continuous heating device 10 shown in FIG. 8a to FIG. 8d, a nozzle 50 for feeding in the additional mixture being provided at the tubular body 20 prior to the internal heating device 30, the mixture and the additional mixture being simultaneously fed into the tubular body 20, and the same being heated and shaped in the tubular body 20. Note that FIG. 8a, FIG. 8b, FIG. 8c and FIG. 8d show modes in which the nozzle 50 is provided at the tubular body 20 of the continuous heating device 10 shown in, respectively, FIG. 5, FIG. 6a, FIG. 6b and FIG. 7.

Types and characteristics of the additional mixture are not particularly limited, but a viscosity in a range that will not flow out from the processed food product containing protein is required. In specific terms, if the penetrating additional mixture has the same composition but is made a different color from the heating object at the outer side, a pattern may be formed in cross section. Alternatively, if the penetrating additional mixture is a condiment such as ketchup or mayonnaise, then a flavored sausage or the like may be fabricated. It is preferable if viscosity of the condiment is raised to a level that will not flow. The penetrating additional mixture need not be of a single type; plural additional mixtures may be caused to penetrate by a plural number of the nozzle 50. If pressures with which the heating object at the outer side and the penetrating additional mixture are fed in are made equal, mixing thereof within the tubular body may be prevented. As an example, if the nozzle 50 is heart-shaped and pasted meat of a different color from the outer side is the penetrating additional mixture, a heart-shaped pattern may be formed in the cross section of the finished sausage.

Alternatively, by simultaneously introducing plural types of mixture that are gelated by heating into the tubular body, a processed food product containing protein may be fabricated with stripes in two or three colors, or the like.

Examples of the present invention are recited below; the present invention is not limited in any way by these Examples.

EXAMPLES

—Fabrication Method—

To prepare a pasted meat for fish sausage or scallop-flavor fibrous kamaboko with the composition in Table 1, table salt was added to surimi and ground in, after which other condiments, vegetable protein, starch, vegetable oil and water were added, mixed in and formed into a paste.

The respective pasted meat was fed by a pump to a fluoride resin tubular body and heated by microwaves at a heating section of the tubular body, and fish sausage or scallop-flavor fibrous kamaboko was fabricated without a casing. Continuous microwave heating equipment fabricated by HIRODEN LTD. was used for the microwave heating.

Using the continuous microwave heating equipment, the outputs of magnetrons were regulated such that the heating temperature reached a core temperature of the heating object of 85° C. The equipment used for the continuous microwave heating processing was microwave heating equipment divided between three sections of a metal wall at the outer periphery of the tubular body; microwave generation devices (the magnetrons) of the respective sections were mounted at relative angles of 120°. The diameter of the employed tubular body was 23 mm and the length of the heating section of the tubular body was 2000 mm.

TABLE 1

| Component | Fish sausage (% by weight) | Scallop-flavor fibrous kamaboko (% by weight) |
| --- | --- | --- |
| Surimi | 39.4 | 45.0 |
| Vegetable protein | 5.8 | 0.0 |
| Starch | 9.5 | 9.2 |
| Table salt | 1.3 | 1.1 |
| Other condiments | 6.2 | 5.7 |
| Oil/fat | 7.9 | 5.0 |
| Added water | 29.9 | 34.0 |
| Total | 100.0 | 100.0 |

Example 1: Fish Sausage

Fish sausages were fabricated by the fabrication method described above. As shown in Table 2, apart from a Comparative Example that employed only a vertical direction feeding system, horizontal direction feeding systems were employed for the fabrication. The total length of a tube constituting a non-heating section tubular body, the shape of the tube, the height difference of the tube (between the end point of the heating section and the highest point of the tube), and the presence or absence and type of a cutting device were varied. Quartering by a cutting device was implemented by disposing bisecting blades at two locations. In a mesh of a cutting device, a network of stainless steel with wire diameters of 0.5 mm and aperture portion sides of 2 mm or 3 mm was used.

Flash boiling did not occur in any of the conditions; stable production was possible.

For reference, average pressures in the tubular body at times when fabrication was stable were measured and are shown in Table 2. The measurement method was that a pressure sensor (GP-M010 from KEYENCE CORPORATION) was inserted into the tubular body in the vicinity of a port of the microwave heating equipment and pressures were continuously recorded (PAPERLESS RECORDER TR-V from KEYENCE CORPORATION). Reasons for average pressures being different under the same conditions are thought to include variations in quality between different lots of the raw materials even when the composition is the same, changes in ambient temperature and the like. With the vertical direction feeding system, which is a conventional technology, stable production was possible with an average pressure of 250 kPa or less. The tube of the heating section of the vertical direction feeding system, was vertical (2000 mm); it is likely that this produced at least a pressure that prevents flash boiling. Around 100 kPa is thought to be sufficient for stable feeding.

Similarly to when using the vertical direction feeding system, fish sausages without casings could be stably and continuously produced using the horizontal direction feeding systems.

TABLE 2

| Tubular body shape | Cutting device | Tubular body total length (mm) | Height difference (mm) | Average pressure (kPa) |
|---|---|---|---|---|
| FIG. 1b | None | 3500 | — | 250 |
| FIG. 4a | None | 3500 | 500 | 220 |
| FIG. 4b | | 5000 | 500 | 180 |
| FIG. 4a | | 5000 | 500 | 230 |
| FIG. 6a | Quartering | 3500 | 500 | 100 |
| FIG. 6a | | 3500 | 500 | 130 |
| FIG. 6a | | 3500 | 500 | 150 |
| FIG. 6a | | 3500 | 500 | 150 |
| FIG. 6a | | 3500 | 500 | 240 |
| FIG. 5 | Mesh: 2 mm | 3500 | 0 | 150 |
| FIG. 5 | | 3500 | 0 | 240 |
| FIG. 6a | aperture | 3500 | 500 | 180 |
| FIG. 5 | Mesh: 3 mm | 500 | 0 | 200 |
| FIG. 6a | | 3500 | 500 | 130 |
| FIG. 6a | aperture | 3500 | 500 | 165 |
| FIG. 6a | | 3500 | 500 | 170 |

Example 2: Scallop-Flavor Fibrous Kamaboko

Scallop-flavor fibrous kamabokos were fabricated in the same manner as in Example 1 using the pasted meat composition in Table 1. A product with the shape of fibrous kamaboko could be produced continuously by providing a mesh-form cutting device at the non-heating section of the tubular body. The kamaboko could be produced stably without explosive boiling in every case: when the cutting device was combined with a horizontal direction feeding system; when the cutting device was combined with a height difference of the non-heating section; and when the cutting device was combined with the vertical direction feeding system. Because the oil/fat content was smaller than for fish sausage, the average pressures in the tubular body were higher.

TABLE 3

| Tubular body shape | Cutting device | Tubular body total length (mm) | Height difference (mm) | Average pressure (kPa) |
|---|---|---|---|---|
| FIG. 5 | Mesh: 3 mm | 3500 | 0 | 380 |
| FIG. 6a | aperture | 3500 | 500 | 480 |
| FIG. 6a | | 3500 | 500 | 350 |
| FIG. 1b | | 3500 | — | 400 |
| FIG. 1b | | 5000 | — | 230 |

Example 3: Scallop-Flavor Fibrous Kamaboko

Scallop-flavor fibrous kamabokos (no cutting device) and scallop-flavor fibrous kamabokos (with cutting device) were fabricated in the same manner as in Example 1 using the pasted meat composition in Table 1. In this Example, an outer skin nozzle for supplying a lubricating agent was employed. Soy sauce or soy sauce with caramel was used as the lubricating agent, as recited in Table 4. In each method, kamaboko could be produced stably without flash boiling occurring. As shown in Table 4, the average internal pressure could be lowered by the use of a lubricating agent.

TABLE 4

| Tubular body shape | Cutting device | Tubular body total length (mm) | Height difference (mm) | Outer skin nozzle | Average pressure (kPa) |
|---|---|---|---|---|---|
| FIG. 5 | Mesh: 3 mm | 3500 | 100 | Soy sauce | 130 |
| FIG. 6a | aperture | 3500 | 500 | | 90 |
| FIG. 4a | None | 3500 | 500 | | 90 |
| FIG. 4a | | 3500 | 500 | Soy sauce + caramel | 140 |
| FIG. 4a | | 3500 | 500 | | 110 |

INDUSTRIAL APPLICABILITY

According to the method of fabricating the present invention, heating by interior heating in a tubular body may be conducted in a horizontal state. Thus processed food products containing protein may be continuously produced with higher operational efficiency.

The invention claimed is:

1. A method of fabricating a processed food product containing protein, the method comprising: moving a mixture in a tubular body, the mixture containing protein, lipid and water and having flowability, and the tubular body including a heating section and a non-heating section succeeding the heating section; and while moving the mixture, continuously heat-coagulating the mixture by an interior heating system and shaping the mixture, wherein the heating section is disposed to be horizontal or inclined by at most 300 relative to the horizontal, wherein the non-heating section includes a back pressure structure that produces back pressure inside the tubular body, and wherein the back pressure structure is formed as a high position portion at which at least a portion of the non-heating section is at a higher position in a vertical direction than an end point of the heating section.

2. The method of fabricating a processed food product containing protein according to claim 1, wherein the high position portion is inflected vertically upward from the end point of the heating section, and a terminal end region of the high position portion is horizontal or inclined by at most 30° relative to the horizontal.

3. The method of fabricating a processed food product containing protein according to claim 1, wherein the high position portion is inflected vertically upward from the end point of the heating section and subsequently inflected vertically downward, and a terminal end of the non-heating section is horizontal or inclined by at most 30° relative to the horizontal.

4. The method of fabricating a processed food product containing protein according to claim 1, wherein the high position portion includes at least one loop formed coiling upward in the vertical direction from the end point of the heating section.

5. The method of fabricating a processed food product containing protein according to claim 1, wherein the back pressure structure includes a cutting device disposed at the non-heating section, the cutting device cutting the heated and shaped mixture.

6. The method of fabricating a processed food product containing protein according to claim 5, wherein the cutting device includes at least one of a cutting wire or a blade.

7. The method of fabricating a processed food product containing protein according to claim 1, wherein the interior heating system is microwave heating, Joule heating or high frequency heating.

8. The method of fabricating a processed food product containing protein according to claim 1, wherein the mixture is heated at the heating section to a core temperature of 70° C. to 120° C.

9. The method of fabricating a processed food product containing protein according to claim 1, further comprising rotating at least one of the heating section or the non-heating section.

10. The method of fabricating a processed food product containing protein according to claim 1, wherein
    a nozzle is provided that feeds an additional mixture that is different from the mixture into the tubular body,
    the mixture and the additional mixture are simultaneously fed into the tubular body and are heated and shaped in the tubular body, and
    the food product is fabricated with a form in which a layer is formed by the mixture and the additional mixture penetrates through a core region in the layer.

11. The method of fabricating a processed food product containing protein according to claim 1, further comprising supplying a lubricating agent between the tubular body and the mixture.

* * * * *